United States Patent
Nishida

[11] Patent Number: 5,880,861
[45] Date of Patent: Mar. 9, 1999

[54] ILLUMINATION OPTICAL SYSTEM

[75] Inventor: Hiroyuki Nishida, Hachioji, Japan

[73] Assignee: Olympus Optical Co., Ltd., Tokyo, Japan

[21] Appl. No.: 835,226

[22] Filed: Apr. 7, 1997

[30] Foreign Application Priority Data

Apr. 8, 1996 [JP] Japan .................................... 8-085287

[51] Int. Cl.$^6$ ............................. G02B 5/02; G02B 21/12; G02B 5/32
[52] U.S. Cl. .............................. 359/15; 359/385; 359/599
[58] Field of Search .................................. 359/15, 16, 19, 359/9, 599, 387, 385, 389, 707

[56] References Cited

U.S. PATENT DOCUMENTS

| | | | |
|---|---|---|---|
| 3,708,217 | 1/1973 | McMahon | 359/15 |
| 5,046,793 | 9/1991 | Hockley et al. | |
| 5,418,631 | 5/1995 | Tedesco. | |
| 5,671,084 | 9/1997 | Kurtz | 359/362 |

FOREIGN PATENT DOCUMENTS 59-111124  6/1984  Japan.

OTHER PUBLICATIONS

Wadle et al., Abstract. Holographic diffusers, Optical Engineering/Jan. 1994/vol. 33 No. 1/213.

"Methods for Providing Uniform Diffuse Illumination," IBM Tech. Dis. Bull., vol. 27, No. 11, pp. 6683–6685, Apr., 1985.

*Primary Examiner*—Jon Henry
*Attorney, Agent, or Firm*—Pillsbury Madison & Sutro LLP

[57] ABSTRACT

An illumination optical system to be disposed between a light source and a specimen comprises, in order from a light source side, a collector lens, a diffusing plate having a diffusing surface, a light source image projecting lens, and a condenser lens. A field stop is arranged between the diffusing plate and the light source image projecting lens, and an aperture stop is arranged between the light source image projecting lens and the condenser lens. The illumination optical system can attain an ideal numerical aperture and provide uniform and bright illumination light over a predetermined area upon diffusion characteristics on the diffusing surface being adjusted.

10 Claims, 6 Drawing Sheets

ILLUMINATION OPTICAL SYSTEM

BACKGROUND OF THE INVENTION a) Field of the Invention

The present invention relates to an illumination system used for optical instruments such as microscopes, specifically to that assuring an optimum numerical aperture and bright and uniform illumination light over a predetermined area, upon characteristics of a diffusing surface (diffusing plate) disposed in a path of light being adjustable by means of holographic techniques or the like.

b) Description of the Prior Art

There is art for varying diffusion characteristics on a diffusing surface, portion by portion by application of holographic technique, as described in U.S. Pat. Nos. 5,046,793 and 5,418,631, "Holographic diffuser", Wadle et al., Opt.Eng.33,213–218 (1994), etc.

On the other hand, there is other art using a fly eye lens for attaining uniform brightness of illumination, as generally applied to steppers. Specifically, Japanese Preliminary Publication No. Sho 59-111,124 discloses an example of this art applied to a microscope.

Where light from a diffusing plate is used as illumination light via a lens, the principal diffusion direction and the diffusion range of the diffused light should be optimized on the diffusing plate, portion by portion, for attaining an ideal numerical aperture and uniform and bright illumination light over a predetermined area. However, this is not feasible with an ordinary diffusing plate. For example, in a microscope optical system where a Koehler illumination system is applied so that an image of a light source is projected on a pupil of a condenser optical system, non-uniform light emission of the light source caused by a filament is dissolved by a configuration in which a diffusing plate is disposed between a collector optical system and a condenser optical system so that non-uniformity of illumination on a specimen surface is stayed as much as possible and so that light rays fill a sufficient area of the pupil. However, in practice, since diffusion characteristics on the diffusing plate cannot be controlled in a fine manner, if the degree of diffusion is set so high as to give a satisfactory level of both of the removal of illumination non-uniformity on the specimen surface and the occupation of the pupil by light rays, loss of amount of light caused by such a high degree of diffusion renders the visual field of the microscope dark. Therefore, the conventional microscope optical system keeps a balance between these requirements upon degree of diffusion being more or less moderated.

On the other hand, holographic techniques may be applied to a diffusing surface for the purpose of changing diffusion characteristics thereon, portion by portion, as described in the aforementioned U.S. Pat. No. 5,418,631, which is configured such that principal diffusion directions of diffused light at the diffusing surface are uniform despite that incident angles of the corresponding incident light differ, portion by portion, on the diffusing surface because light rays that emerge from the diffusing plate are to directly illuminate an object. Consequently, the principal diffusion direction is not varied, portion by portion, on the diffusing surface. Furthermore, U.S. Pat. No. 5,418,631 does not mention the numerical aperture for illumination light, because optical elements such as lenses are not disposed after the diffusing surface, i.e. illumination light involving a large numerical aperture is not considered.

In the optical system disclosed by U.S. Pat. No. 5,046,793, the principal diffusion direction of the diffused light is varied, portion by portion, on the diffusing surface, because the optical system is used for a display screen. However, uniformity of illumination light or the numerical aperture for illumination light are not mentioned.

"Holographic diffuser", Wadle et al. Opt. Eng. 33,213–218 (1994) describes a technique for adjusting angular range of diffusion, but does not mention how the result affects the uniformity of the illumination light or the numerical aperture for the illumination light.

As for the approach using a fly eye lens for obtaining uniform illumination, if an extremely high uniformity of illumination with deviation not greater than several percent is required, as in the case of a stepper, an optical system including a unit of two lens surfaces is employed. Such an approach involves a more complex structure than a method according to which uniform illumination light is obtained by a single diffusing plate, and sometimes needs a certain adjustment device. These features are disadvantageous.

Where the requirement for illumination uniformity is not so severe as in the stepper, there is art in which a fly eye lens forms multiple filament images as a secondary light source spreading in a space for the purposes of assuaring a certain numerical aperture for illumination light and reducing non-uniformity of illumination brightness, as shown, for example, in Japanese Patent Preliminary Publication No. Sho 59-111,124. However, in practice, since it is impossible to reduce the size of each lens element of the fly eye lens to infinity, this approach involves a defect in that borders between the lens elements or the plurality of filament images are directly visible at the pupil.

To overcome this defect, the illumination system disclosed by Sho 59-111,124 is configured such that a diffusing plate having a very small diffusing effect is disposed after the fly eye lens. In this case also, the structure becomes more complex than a configuration in which a diffusing plate is used alone.

SUMMARY OF THE INVENTION

An object of the present invention is to provide an illumination optical system which has an optimum numerical aperture and provides uniform and bright illumination light over a predetermined area.

In order to attain the above-mentioned object, an illumination optical system according to the present invention, which is to be arranged between a light source and an object, includes at least one diffusing surface and a lens unit for projecting diffused light from the diffusing surface on the object, wherein a pattern on the diffusing surface is formed using a holographic technique.

Furthermore, an illumination optical system according to the present invention includes at least one diffusing surface and a lens unit for projecting diffused light from the diffusing surface on the object, wherein diffusion characteristics at the diffusing surface vary, portion by portion, thereon.

Furthermore, an illumination optical system according to the present invention includes at least one diffusing surface and a lens unit for projecting diffused light from the diffusing surface on the object, wherein diffusion characteristics at the diffusing surface vary, portion by portion, thereon to form a distribution of the diffusion characteristics that is symmetrical about an optical axis.

This and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Preceeding the descriptions of individual embodiments, general explanation will be made on features and functions of an illumination optical system according to the present invention.

As described above, an illumination optical system according to the present invention includes at least one diffusing surface and a lens unit for projecting diffused light from the diffusing surface on an object, wherein a pattern on the diffusing surface is formed using a holographic technique. Where the object is irradiated with the diffused light via the lenses, an ideal arrangement is such as allow characteristics of the diffused light that emerges from the diffusing surface to be already optimized at the diffusing surface. This is feasible if one forms a desirable pattern arbitrarily using a holographic technique.

Figure 1:
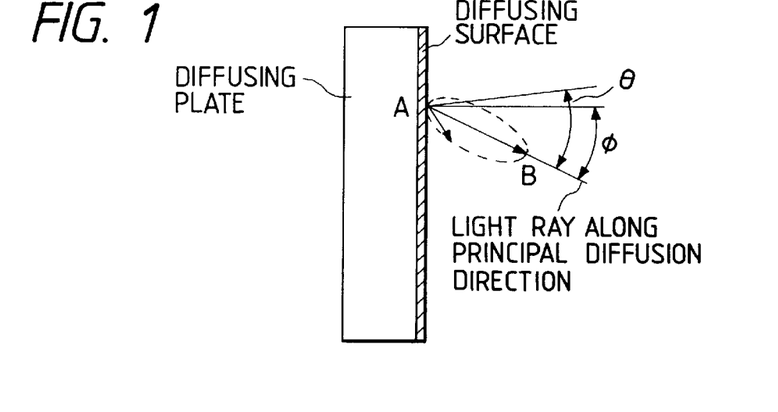
FIG. 1 is a view for explaining a principal diffusion direction and a diffusion range defined where a diffusing plate is disposed between a collector optical system and a condenser optical system.

Now, a detailed explanation is made on the diffusion characteristics of the diffused light. The diffusion characteristics include a principal diffusion direction and a diffusion range. FIG. 1 shows a diffusing plate disposed between a collector optical system and a condenser optical system which are not shown. Light impinging on the diffusing surface at a point A is diffused with a distribution as schematically illustrated with a dash line. With respect to a line segment from the point A to a point on the dash line (a point B, for example), its direction corresponds to a direction in which the diffused light travels, and its length represents intensity of the diffused light in that direction. A direction where the longest line segment is taken, i.e. a direction in which intensity of the diffused light is highest, is defined as the principal diffusion direction, and the diffusion range means how wide the diffused light ranges. Since the distribution of the diffused light is substantially symmetrical about the principal diffusion direction (segment AB), the diffusion range can be expressed with an absolute value of an angular width from the principal diffusion direction to a limit diffusion direction on one side (angle$\theta$ in FIG. 1). In the present specification, the limit diffusion direction is defined as a direction where intensity of the diffused light is 20% of that along the principal diffusion direction. FIG. 1 shows an angle$\phi$ also, which represents the principal diffusion direction as expressed in an angle relative to a perpendicular to the diffusing surface (angle of principal diffusion direction).

Figure 2:
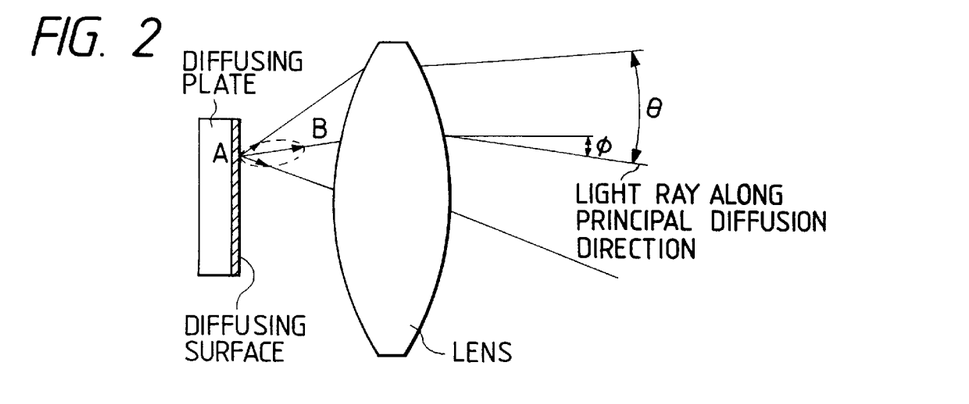
FIG. 2 is a view for explaining a principal direction and a diffusion range defined where a lens is disposed after a diffusing plate.

Furthermore, since a diffusing surface of an ordinary diffusing plate can be regarded as composed of minute prisms randomly arranged, one may set, without holographic techniques, diffusion characteristics at a diffusing surface, portion by portion, by arranging minute prisms with an optimum pattern calculated with a computer or the like. An effect similar to the effect by the holographic technique is expected if an illumination optical system to be disposed between a light source and an object comprises at least one diffusing surface and a lens unit for projecting diffused light from the diffusing surface on the object, wherein the diffusion characteristics at the diffusing surface vary, portion by portion, as shown in FIG. 2. In this case, however, the angle of principal diffusion direction and the angle of diffusion range are defined as shown in FIG. 2.

Furthermore, since most optical systems, except for special types, are made symmetrical about the optical axis, it is preferred that the distribution of diffusion characteristics assumes symmetry about the optical axis.

Furthermore, where the distribution of diffusion characteristics is symmetrical about the optical axis, for example, where the principal diffusion directions at individual portions on the diffusing surface are converged on one point, the diffusing surface is regarded as having a lens function in itself. Therefore, a configuration in which an illumination optical system which is disposed between a light source and an object and is free from a lens unit for projecting diffused light on the object and comprises at least one diffusing surface is allowable, wherein the diffusion characteristics at the diffusing surface are varied, portion by portion, to be symmetrical about an optical axis.

In this case also, it is preferred that a pattern on the diffusing surface is formed by means of a holographic technique.

Figure 3:
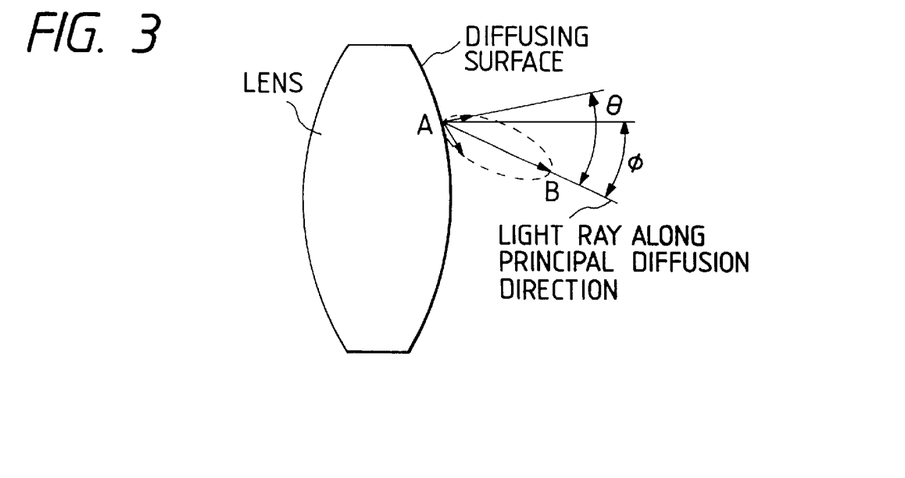
FIG. 3 is a view for explaining a principal direction and a diffusion range defined where a diffusing surface is formed on a lens surface.

If, for example, a conventional type diffusing surface is provided on a lens surface, characteristics of emergent light seemingly vary between an axial portion and a marginal portion due to the radius of curvature of the lens, as shown in FIG. 3. However, such an arrangement is disadvantageous with respect to brightness uniformity of illumination light and the numerical aperture for illumination light, for diffusion characteristics inherent in the diffusing surface is not controlled, portion by portion. Then, in general, a diffusing surface is not formed on a surface having a radius of curvature. In contrast, according to the present invention, since diffusion characteristics inherent in a diffusing surface are adjustable by means of holographic techniques, or the like, the diffusing surface can be provided on a surface that has a finite radius of curvature which is included in a collector optical system disposed between a light source and a lens unit for projecting the diffused light from the diffusing surface on the object. Providing the diffusing surface on a lens, for example, allows the illumination optical system to be compact and inexpensive.

Also, providing the diffusing surface on a mirror surface is allowable.

In a microscope optical system, if an illumination optical system disposed between a light source and an object comprises, in order from a light source side, a collector optical system, a diffusing surface and a condenser optical system with diffusion characteristics at the diffusing surface being adjusted, it can achieve uniformity of illumination brightness and assure a sufficient numerical aperture for illumination light without degradation of brightness.

In this case, it is preferred that the illumination optical system comprising, in order from a light source side, a collector optical system, a light diffusing surface, a light source image projecting system and a condenser optical system is configured such that an angle $\theta$ of diffusion range of diffused light at the diffusing surface satisfies a condition $$0.9 \times \left\{ \frac{f_{CD} \cdot NA}{f_{FS}} - \frac{D}{f_{CO}} \right\} \leq \sin\theta \leq 1.2 \times \frac{f_{CD} \cdot NA}{f_{FS}} \quad (1)$$

where $f_{CO}$ is a focal length of the collector optical system as a whole, $f_{FS}$ is a focal length of the light source image projecting optical system as a whole, $f_{CD}$ is a focal length of the condenser optical system as a whole, NA is a numerical aperture for illumination light emerges from the condenser optical system, and D is a radius or half a diagonal length of the light source.

In the condition (1), each of the terms expressed by $f_{CD}$, NA and $f_{FS}$ introduces an angle that is necessary for paraxial assurance of numerical aperture for the illumination light in a partial optical system from the diffusing surface to a specimen surface, and each of the terms expressed by D and $f_{CO}$ introduces an angle that is inherent in off-axial rays derived from the light source having a certain dimension, in a partial optical system from the light source to the diffusing surface. Therefore, a difference between these two terms, i.e. the left-hand member of the condition (1), gives a minimum value of the angle of diffusion range necessary at the diffusing surface taking only the numerical aperture for illumination light into consideration based on a supposition that the off-axial rays can be utilized at maximum.

Figure 4:
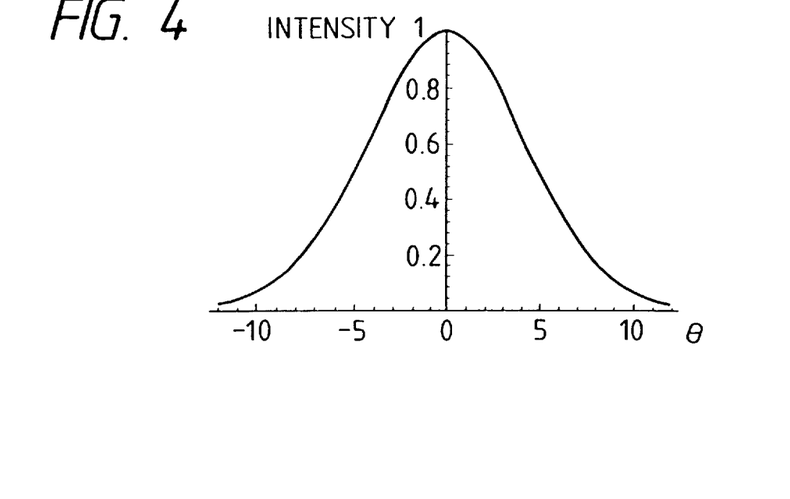
FIG. 4 is a graph showing a diffusing characteristic of a diffusing plate used in an illumination optical system of the present invention.

The lower limit of the condition (1) is derived from a limit where a shortage of the numerical aperture for the illumination light becomes noticeable considering angular range of the diffused light. On the other hand, if the numerical aperture alone is to be considered, it is not necessary to determine an upper limit. However, since an increase in angle of diffusion range causes an increase in eclipsed rays, rendering the visual field dark, too large an angle of diffusion range is not desirable either. In view of illumination uniformity also, if the intensity distribution for direction of diffused light ray is uniform, setting the angle of the diffision range larger than necessary is not preferable. However, since the diffused light emergent from the diffusing plate does not have a uniform intensity over its diffusion range (see FIG. 4), it is preferred, in practice, that the angle of diffusion range is set somewhat larger so that the brightness becomes substantially uniform within an effective area. Consequently, the upper limit of the condition (1) is determined considering a balance between brightness and uniformity of illumination.

Described above is a condition of the angle of diffusion range of diffused light, which is applicable where the diffusion surface assumes uniform characteristics over individual portions thereof. However, since a diffusing element used in the illumination optical system according to the present invention is allowed to vary diffusion characteristics, portion by portion, on its diffusing surface, much better performance is feasible by means of control upon the principal diffusion direction. Therefore, it is preferred that an illumination optical system according to the present invention be configured such that principal diffusion directions of diffused light at the diffusing surface are more (optical) in an axial direction than directions of the corresponding incident light at the diffusing surface. Such a configuration allows less light rays to be eclipsed outside the optical system and thus can improve brightness of illumination light provided.

It is preferred, specifically, that the configuration is such that a principal diffusion direction of diffused light is more in an axial direction as the point on the diffusing surface from which the diffused light emerges is more distant from the optical axis. This is because a light ray within an effective range determined by a numerical aperture for illumination light should emerge from the diffusing surface at a greater angle with the optical axis as its point of emergence on the diffusing surface is more distant from the optical axis. Such a configuration allows much less light rays to be eclipsed and thus can further improve brightness of illumination light.

If light is not diffused to cause variation of travelling directions of rays in it, an ideal configuration for assurance of numerical aperture for illumination light is such as that which causes the light rays to be converged on a center of a field stop. However, for the purpose of achieving uniformity of illumination brightness, it is preferred that light rays emerge with a certain range of directional variation by diffusion with somewhat smaller angles of principal diffusion directions. Therefore, according to the present invention, an illumination optical system to be disposed between a light source and an object comprising, in order from a light source side, a collector optical system, a diffusing surface, a light source image projecting optical system and a condenser optical system is preferably configured such that an angle $\phi_E$ of the principal diffusion direction of diffused light at a point on a border of an effective area (i.e. at an effective radius) of the diffusing surface satisfies a condition $$0 \leq \sin\phi_E \leq \frac{f_{CD} \cdot NA}{f_{FS}} \quad (2)$$

where $f_{FS}$ is a focal length of the light source image projecting optical system as a whole, $f_{CD}$ is a focal length of the condenser optical system as a whole, and NA is a numerical aperture for illumination light emerges from the condenser optical system.

As for the condition (2), the lower limit is set considering a case where the diffusing surface involves no difference in directional characteristics between individual portions thereof, and the upper limit means a case where angles of principal diffusion directions are taken to be large enough to fully assure numerical aperture. Therefore, if $\sin \phi_E$ exceeds the upper limit, light rays along the principal diffusion directions, which have highest intensity, are eclipsed. Moreover, since the diffused light emerges with a directional variation determined by the angle of diffusion range, too large an angle of principal diffusion direction at the effective radius of the diffusing surface to satisfy the condition (2) renders the illumination light extremely dark.

Although it is preferred that the principal diffusion directions are fully controlled over all portions on the diffusing surface, not limited to the portions at the effective radius thereof, small deviation of the principal diffusion directions from optimum values is practically allowable in view of the diffused light having a range of diffusion directions. However, since such a deviation, if too large, would spoil uniformity of illumination brightness, it should preferably fall within an allowable range.

On the basis of this consideration, it is preferred that the illumination optical system according to the present invention is configured such that angles of principal diffusion directions at individual points on the diffusing surface are related to one another, to satisfy a condition $$0.8 \times \frac{r1}{\tan\phi 1} \leq \frac{r2}{\tan\phi 2} \leq 1.2 \times \frac{r1}{\tan\phi 1} \qquad (3)$$

where $r_1$ is a distance from any first point on the diffusing surface to the optical axis, $\phi_1$ is an angle of principal diffusion direction of diffused light at the first point, $r_2$ is a distance from any second point on the diffusing surface to the optical axis, and $\phi_2$ is an angle of principal diffusion direction of diffused light at the second point.

If $r_2/\tan\phi_2$ exceeds the range defined by the condition (3), deviation of principal diffusion directions from the ideal convergence relationship becomes so large that uniformity of illumination brightness is spoiled.

While described above is a case where the diffusing surface is disposed between the collector optical system and the condenser optical system in an illumination optical system for a microscope, the diffusing surface may be disposed inside the collector optical system on condition that characteristics of light emergent from the collector optical system are controlled. An illumination optical system to be disposed between a light source and an object is allowed to comprise, in order from a light source side, a collector optical system, a light source image projecting optical system and a condenser optical system, wherein a diffusing surface is arranged inside the collector optical system.

In this case, similarly, it is preferred that the illumination optical system for a microscope that comprises, in order from a light source side, a collector optical system in which a diffusing surface is provided, a light source image projecting optical system and a condenser optical system is configured such that $\theta'$, which is defined as an angle of diffusion range of diffused light emergent from the collector optical system, satisfies a condition $$0.9 \times \left\{ \frac{f_{CD} \cdot NA}{f_{FS}} - \frac{D}{f_{CO}} \right\} \leq \sin\theta' \leq 1.2 \times \frac{f_{CD} \cdot NA}{f_{FS}} \qquad (4)$$

where $f_{CO}$ is a focal length of the collector optical system as a whole, $f_{FS}$ is a focal length of the light source image projecting optical system as a whole, $f_{CD}$ is a focal length of the condenser optical system as a whole, NA is a numerical aperture for illumination light emergent from the condenser optical system, and D is a radius or half a diagonal length of the light source.

The condition (4) is introduced based on the same consideration as the condition (1).

Similar to the illumination optical system specified by the condition (1), it is preferred that the illumination optical system specified by the condition (4) also is configured such that principal diffusion directions of diffused light from the diffusing surface are, after the collector optical system, more toward the axial direction than directions of the corresponding incident light at the diffusing surface. Specifically, it is preferred that the configuration is such that a principal diffusion direction of diffused light is, after intervention of the collector optical system, more toward the axial direction as the point on the diffusing surface from which the diffused light emerges is more distant from the optical axis.

Furthermore, according to the present invention, the illumination optical system to be disposed between a light source and an object that comprises, in order from a light source side, a collector optical system in which a diffusing surface is provided, a light source image projecting optical system and a condenser optical system is preferably configured such that $\phi_E'$, which is defined as an angle of principal diffusion direction of diffused light emergent from a last surface of the collector optical system, the diffused light being corresponding to incident light incident at a position on a border of an effective area of the diffusing surface, satisfies a condition $$0 \leq \sin\phi_E' \leq \frac{f_{CD} \cdot NA}{f_{FS}} \qquad (5)$$

where $f_{FS}$ is a focal length of the light source image projecting optical system as a whole, $f_{CD}$ is a focal length of the condenser optical system as a whole, and NA is a numerical aperture for illumination light emergent from the condenser optical system.

Furthermore, it is preferred that the illumination optical system according to the present invention is configured such that angles of principal diffusion directions at individual points on a last surface of the collector optical system are related to one another, to satisfy a condition $$0.8 \times \frac{r1'}{\tan\phi 1'} \leq \frac{r2'}{\tan\phi 2'} \leq 1.2 \times \frac{r1'}{\tan\phi 1'} \qquad (6)$$

where $r_1'$ is a distance from a point where a ray along a principal diffusion direction emergent from any first point on the diffusing surface crosses a last surface of the collector optical system to the optical axis, $\phi_1'$ is an angle of principal diffusion direction of diffused light emergent from this point on the last surface of the collector optical system, $r_2'$ is a distance from another point where another ray along another principal diffusion direction emergent from any second point on the diffusing surface crosses the last surface of the collector optical system to the optical axis, and $\phi_2'$ is an angle of principal diffusion direction of diffused light emergent from this other point on the last surface of the collector optical system.

In general, an illumination optical system for a microscope is provided with a field stop arranged between a collector optical system and a condenser optical system. Since an image of the field stop is to be projected on a specimen surface, a diffusing surface is not provided inside the condenser optical system in a normal configuration. However, if the field stop is dispensable or is not provided in the microscope, the diffusing surface is allowed to be arranged inside the condenser optical system. Consequently, the illumination optical system to be disposed between a light source and an object is allowed to comprise, in order from a light source side, a collector optical system and a condenser optical system with a diffusing surface being provided inside the condenser optical system.

Since epidark illumination requires its special purpose condenser system, a diffusing surface having diffusion characteristics appropriate for this purpose sufficiently works as it is disposed inside a condenser optical system. In this case, it is preferred that the diffusion surface is annularly shaped in conformance with the annularly shaped epidark illumination light. Therefore, according to the present invention, an epidark illumination optical system for a microscope to be disposed between a light source and an object comprising, in order from a light source side, a collector optical system and a condenser optical system is allowed to have an annularly shaped diffusing surface arranged inside the condenser optical system.

In a transmission dark field microscope, a phase-contrast microscope or the like, an illumination optical system for annular illumination is employed with a ring slit being arranged at a pupil position of the condenser optical system. However, in a conventional configuration, no measure other than arranging the ring slit is taken, and thus only a small amount of light passing through the slit can be effectively used. Then, by application of a diffusing element of the present invention as described above, light which could not be effectively used in a conventional system can be utilized, and consequently an illumination optical system for annular illumination which provides much brighter illumination light can be realized. Such an illumination optical system for annular illumination microscopy comprises, in order from a light source side, a collector optical system and a condenser optical system, along with a ring slit located on a pupil surface of the condenser optical system and a diffusing surface arranged at a position between a light source and the ring slit, and is configured such that light rays along principal diffusion directions of diffused light from the diffusing surface enter the ring slit.

In this case, specifically, it is preferred that the light rays along the principal diffusion directions from individual points on the diffusing surface toward the ring slit are substantially parallel with one another. Since an optimum numerical aperture for annular illumination is substantially narrow, not like for ordinary illumination, a necessary numerical aperture for illumination light can be assured with appropriate setting of the angle of diffusion range alone. This is why the principal diffusion directions dare not be varied, portion by portion, over the diffusing surface.

Furthermore, an illumination optical system comprising, in order from a light source side, a collector lens, a diffusing plate having a diffusing surface and a condenser lens, and further comprising a device for replacing the diffusing plate is adaptable not only to ordinary illumination but also to annular illumination.

Now, the present invention is detailed based on embodiments shown in the drawings.

First Embodiment

Figure 5:
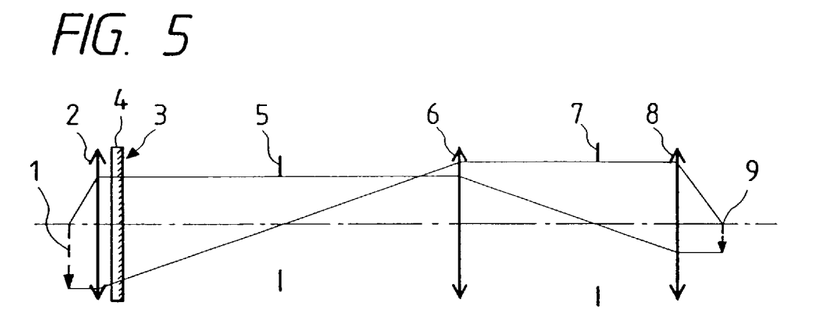
FIG. 5 is a conceptual view showing a basic configuration of an illumination optical system according to a first embodiment.

FIG. 5 is a conceptual view showing a basic configuration of an illumination optical system according to the first embodiment. Arranged between a light source surface 1 and a specimen surface 9 are, in order from a light source side, a collector lens 2, a diffusing plate 4 having a diffusing surface 3, a light source image projecting lens 6 and a condenser lens 8. Also, a field stop 5 is arranged between the diffusing plate 4 and the light source image projecting lens 6, and an aperture stop 7 is arranged between the light source image projecting lens 6 and the condenser lens 8. In this configuration, a focal length $f_{CO}$ of the collector lens 2 is 25 mm, a focal length $f_{FS}$ of the light source image projecting lens 6 is 85 mm, a focal length $f_{CD}$ of the condenser lens 8 is 9 mm, a numerical aperture NA for illumination light emergent from the condenser lens 8 is 1.4, and a radius D of the light source surface 1 is 0.75 mm. An angle θ of the diffusion range at the diffusing plate 4 used in the illumination optical system of the first embodiment is 8°.

In this embodiment, an example of a configuration for the transmission illumination optical system is shown, while a similar configuration is applicable for a reflection illumination optical system also if conditions such as focal lengths are appropriately rearranged.

Second Embodiment

Figure 6:
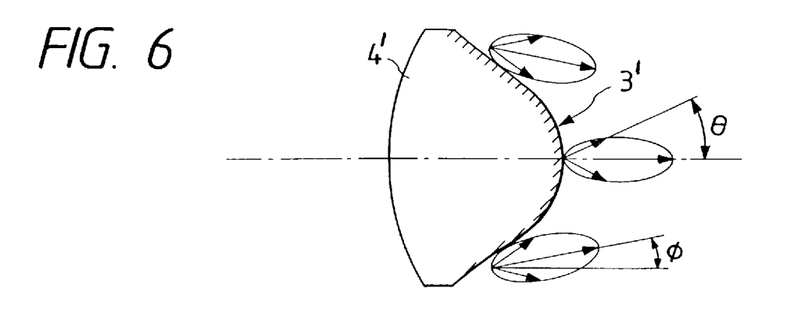
FIG. 6 is a view for explaining characteristics at a diffusing plate used in an illumination optical system of a second embodiment.

A basic configuration of an illumination optical system according to the second embodiment is the same as the first embodiment, associated with the same numerical data such as focal lengths, except that a diffusing plate 4 of the second embodiment functions as a lens also, upon a diffusing surface 3' thereof being formed on a curved surface of the lens. FIG. 6 schematically shows characteristics of the diffusing plate 4' used in the second embodiment, where an effective radius of the diffusing surface 3' is 15 mm, an angle $\phi_E$ of principal diffusion direction at a position on a border of the effective area (i.e. at the effective radius) of the diffusing surface 3' is 3°, and an angle θ of diffusion range is 8°.

Third Embodiment

Figure 7:
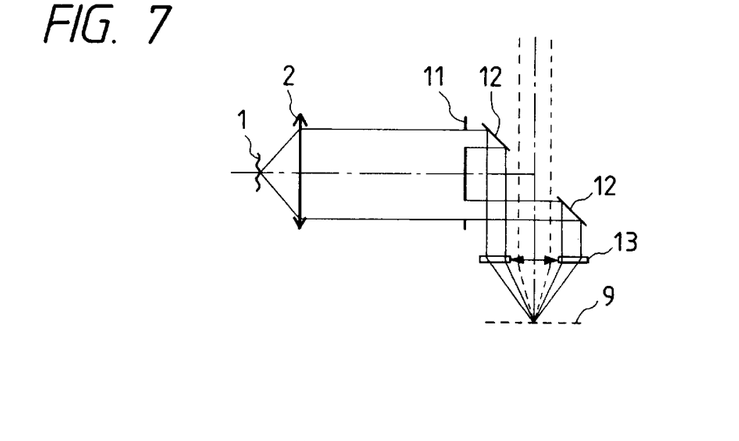
FIG. 7 is a conceptual view showing a basic configuration of an illumination optical system according to a third embodiment.

FIG. 7 is a conceptual view showing a configuration of an illumination optical system according to the third embodiment, which is an example of an epidark illumination optical system. In this type of optical system, a diffusing plate and a torus lens is conventionally used. In contrast, according to the third embodiment, such a torus lens can be omitted because the angle of principal diffusion direction and the angle of diffusion range are adjustable by a diffusing surface. Consequently, in the illumination optical system of the third embodiment, light emitted from a light source 1 is collimated by a collector lens 2, reflected by a mirror 12 via a ring stop 11, and then introduced to a specimen surface 9 by a diffusing surface 13 alone.

Figure 8:
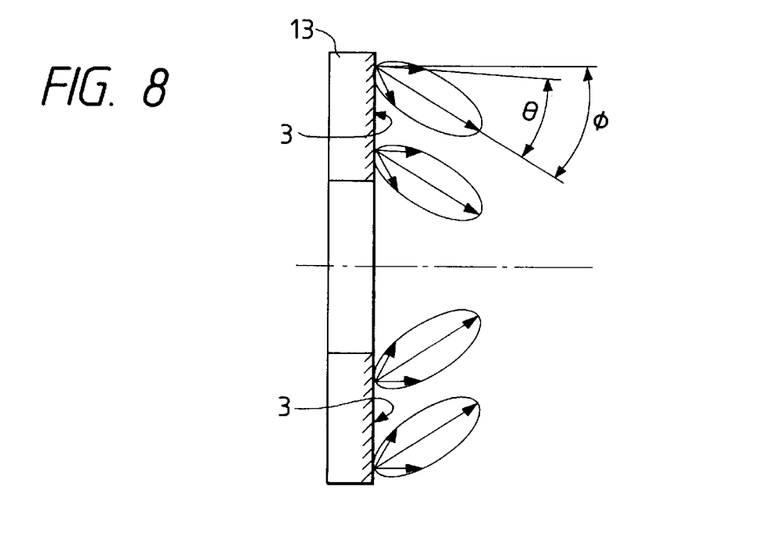
FIG. 8 is a view for explaining characteristics at a diffusing plate used in an illumination optical system of the third embodiment.

In this configuration, light rays to be used for illumination should emerge from the diffusing surface at angles of 30° or 40° on the basis of supposition that numerical aperture NA for epidark illumination light is 0.50 at minimum and 0.65 at maximum. Therefore, as schematically shown in FIG. 8, an angle φ of principal diffusion direction and an angle θ of diffusion range at the diffusing plate 13 are set at 35° and 5°, respectively.

Fourth Embodiment

Figure 9:
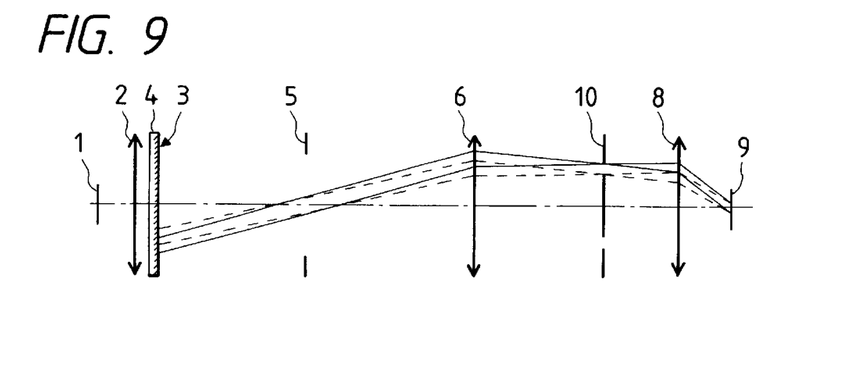
FIG. 9 is a conceptual view showing a basic configuration of an illumination optical system according to a fourth embodiment.
Figure 10:
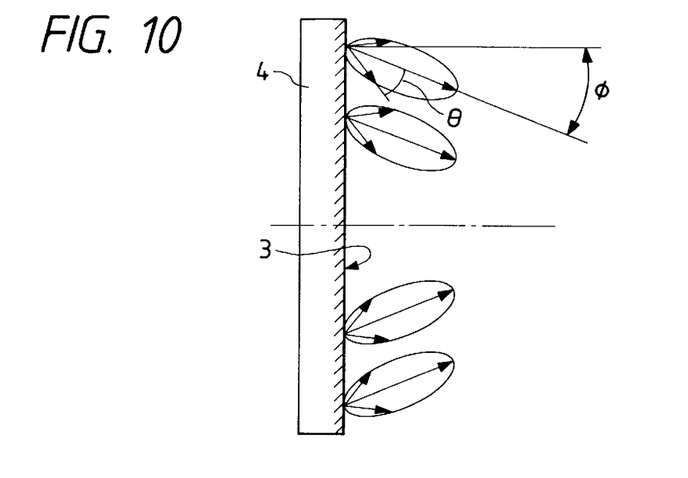
FIG. 10 is a view for explaining characteristics at a diffusing plate used in an illumination optical system of the fourth embodiment.

FIG. 9 is a conceptual view showing a basic configuration of an illumination optical system according to the fourth embodiment. The illumination optical system of this embodiment has the same numerical data on lens systems such as focal lengths as the illumination optical system of the first embodiment. However, according to the fourth embodiment, a ring slit 10 is arranged in place of the aperture stop 7 for the condenser lens 8 of the first embodiment. In this configuration, diffused light rays to be used for illumination should emerge from a diffusing surface 3 at 2.45° at minimum and at 3.03° at maximum on the basis of supposition that numerical aperture for illumination light determined by the ring slit 10 is 0.4 at minimum and 0.5 at maximum. Therefore, as schematically shown in FIG. 10, the angle φ of principal diffusion direction and the angle θ of diffusion range at a diffusing plate 4 are set at 2.73° and 0.3°, respectively. Such a setting allows most of the diffused light to enter inside the ring slit 10. If a radius of an area subject to illumination on a specimen surface 9 is set at 0.13 mm, then a numerical aperture necessary for light entering the ring slit 10 is 0.014. In FIG. 9, solid lines represent light rays passing through the outermost side of the ring slit 10 where the numerical aperture is 0.014 and dash lines represent light rays passing through the innermost side of the ring slit 10 where the numerical aperture is 0.014.

As is understood from the foregoing explanation, characteristics of light emergent from the diffusing surface, as schematically shown in FIG. 10, is appropriate for phase-contrast observation of this embodiment. Considering the angle θ of diffusion range about 8° for ordinary observation of the first embodiment as a reference, one could understand that using the diffusing plate 4 shown in the fourth embodiment improves brightness of illumination light.

Fifth Embodiment

Figure 11:
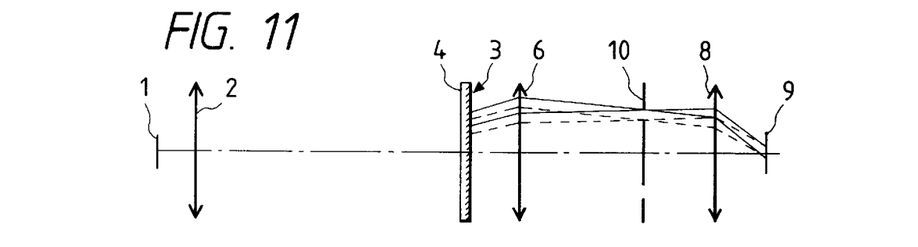
FIG. 11 is a conceptual view showing a basic configuration of an illumination optical system according to a fifth embodiment.
Figure 12:
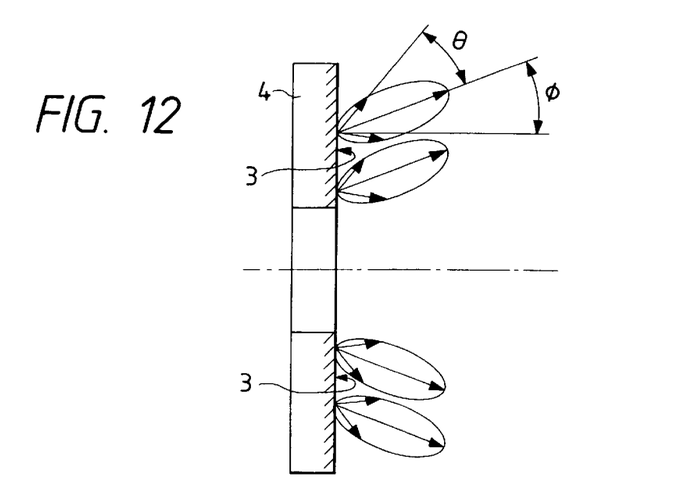
FIG. 12 is a view for explaining characteristics at a diffusing plate used in an illumination optical system of the fifth embodiment.

FIG. 11 is a conceptual view showing a basic configuration of an illumination optical system according to the fifth embodiment. With respect to the basic configuration, the illumination optical system of the fifth embodiment is the same as that shown in the fourth embodiment. However, since the fifth embodiment is directed to a dark field illumination, a difference is in that a numerical aperture NA for illumination light determined by a ring slit 10 is set at 0.8 at minimum, and at 0.9 at maximum. Although a diffusing plate 4 is allowed to be located at the same position as in the fourth embodiment, the fifth embodiment shows an example where the diffusing plate 4 is positioned nearer to a light source image projecting lens 6. In this case, characteristics of the diffusing plate 4 are such as are schematically shown in FIG. 12 (values of θ, φ are the same as the fourth embodiment).

Sixth Embodiment

Figure 13:
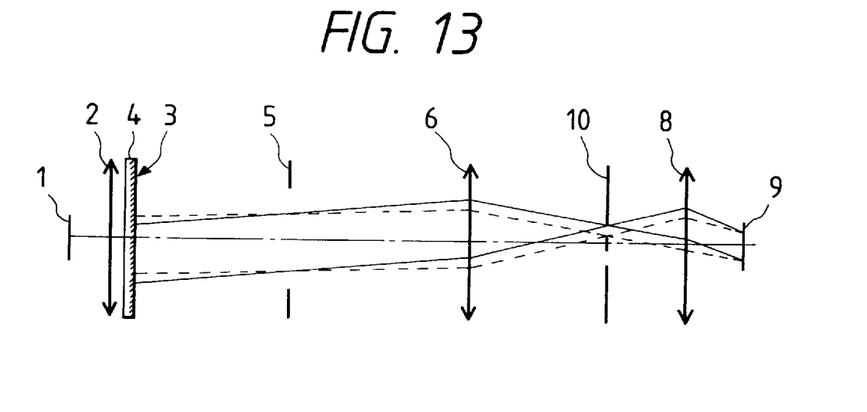
FIG. 13 is a conceptual view showing a basic configuration of an illumination optical system according to a sixth embodiment.
Figure 14:
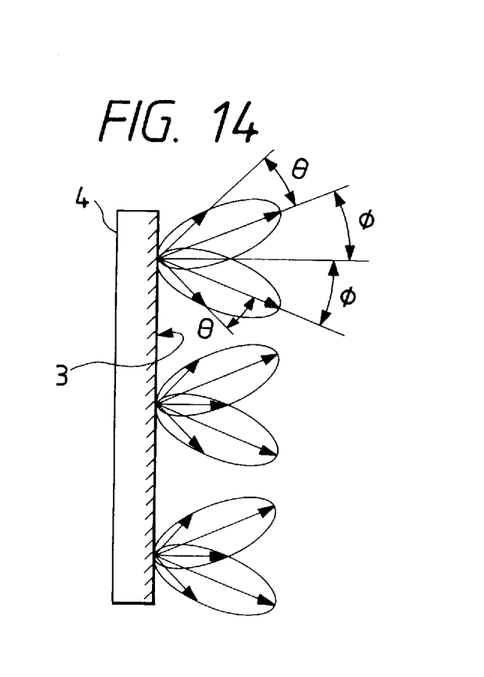
FIG. 14 is a view for explaining characteristics at a diffusing plate used in an illumination optical system of the sixth embodiment.

FIG. 13 is a conceptual view showing a basic configuration of an illumination optical system according to the sixth embodiment. With respect to the basic configuration, the illumination optical system of the sixth embodiment also is the same as that shown in the fourth embodiment. However, since the sixth embodiment is directed to a low-magnification illumination, a difference is in that a diameter of a light beam emergent from the diffusing surface is substantially large. In this case, characteristics of the diffusing plate 4 are required to be such as schematically shown in FIG. 14 (values ofθ, φ are the same as the fourth embodiment). When a holographic technique is applied, such a distribution of diffusion characteristics can be attained by double exposure.

Seventh Embodiment

Figure 15:
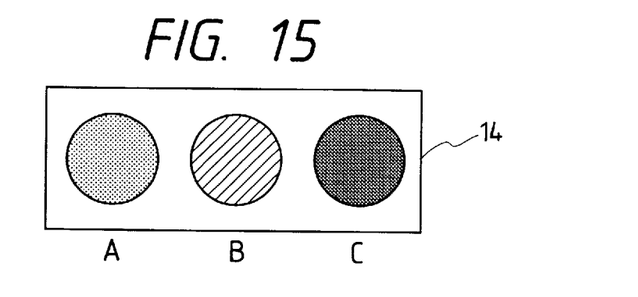
FIG. 15 shows a switchable diffusing plate unit according to a seventh embodiment.
Figure 16:
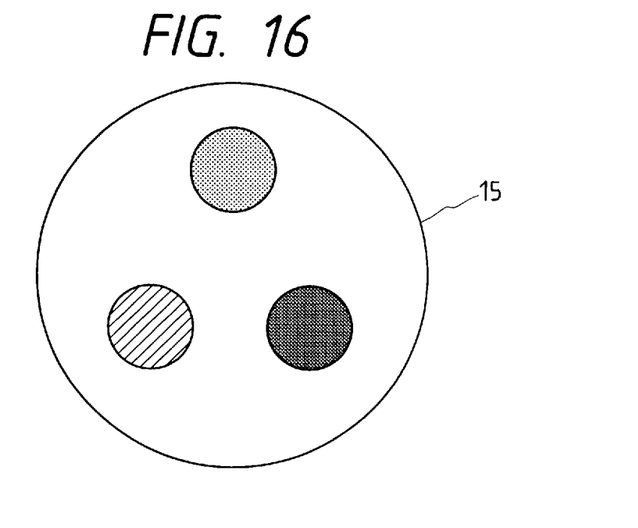
FIG. 16 shows another type of the switchable diffusing plate unit according to the seventh embodiment.
Figure 17:
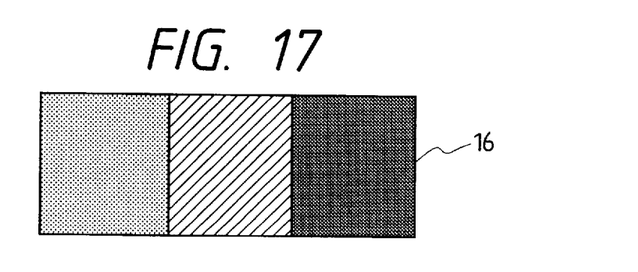
FIG. 17 shows still another type of the switchable diffusing plate unit according to the seventh embodiment.

FIGS. 15–17 show switching devices for diffusing plates according to the present invention. A switching device is constructed such that three kinds of diffusing plates A, B, C, which are for bright field illumination, for dark field illumination and for phase-contrast illumination respectively, are mounted on a slidable frame 14 shown in FIG. 15. The diffusing plates A, B, C are replaced by one another as inserted in and removed from the optical system in accordance with sliding operation of the frame 14. A switching device shown in FIG. 16 is used for the same purpose as the FIG. 15 device, but it uses a turret type frame 15. Furthermore, not limited to the above mentioned type where separate diffusing plates are individually mounted on a frame, a switching device is allowed to be constructed such that diffusing elements produced by different exposures for respective sections in one substrate 16 as shown in FIG. 17 are made insertable and removable, in and out of the optical system.

Although the seventh embodiment shows examples of alternation among three diffusing plates, the number of diffusing plates according to the present invention is not limited to three, as a matter of course.

What is claimed is:

1. An illumination optical system comprising, in order from a side of a light source:

a collector optical system;

a light source image projecting optical system; and a condenser optical system, wherein a diffusing surface is arranged between said collector optical system and said light source image projecting optical system, with the following condition being satisfied:

$$0.9 \times \{f_{CD} \cdot NA/f_{FS} - D/f_{CO}\} \leq \sin\theta \leq 1.2 \times f_{CD} \cdot NA/f_{FS}$$

where θ is an angular width from a principal diffusion direction to a limit diffusion direction of diffused light at each emergent point on said diffusing surface, $f_{CO}$ is a focal length of said collector optical system as a whole, $f_{FS}$ is a focal length of said light source image projecting system as a whole, $f_{CD}$ is a focal length of said condenser optical system as a whole, D is one of a radius or half a diagonal length of the light source, and NA is a numerical aperture for illumination light emergent from said condenser optical system.

2. An illumination optical system according to claim 1, wherein the principal diffusion direction of the diffused light at the emergent point on said diffusing surface is more steeply inclined toward or less steeply inclined away from an optical axis than a direction of a corresponding incident light.

3. An illumination optical system according to claim 2, wherein the principal diffusion direction of the diffused light at the emergent point on said diffusing surface is more steeply inclined toward or less steeply inclined away from the optical axis as the emergent point of the diffused light on said diffusing surface is more distant from the optical axis.

4. An illumination optical system according to claims 2 or 3, wherein the following condition is further satisfied:

$$0 \leq \sin\phi_E \leq f_{CD} \cdot NA/f_{FS}$$

where $\phi_E$ is an angle of a principal diffusion direction of the diffused light at an emergent point on a border of an effective area of said diffusing surface.

5. An illumination optical system according to claims 2 or 3, wherein the following condition is further satisfied:

$$0.8 \times r_1/\tan\phi_1 \leq r_2/\tan\phi_2 \leq 1.2 \times r_1/\tan\phi_1$$

where $\phi_1$ is an angle of a principal diffusion direction of the diffused light at an arbitrary-selected first emergent point on said diffusing surface, $\phi_2$ is an angle of a principal diffusion direction of the diffused light at an arbitrary-selected second emergent point, which is different from the first emergent point, on said diffusing surface, $r_1$ is a distance from the first emergent point on said diffusing surface to the optical axis, and $r_2$ is a distance from the second emergent point on said diffusing surface to the optical axis.

6. An illumination optical system according to claim 4, wherein the following condition is further satisfied:

$$0.8 \times r_1/\tan\phi_1 \leq r_2/\tan\phi_2 \leq 1.2 \times r_1/\tan\phi_1$$

where $\phi_1$ is an angle of a principal diffusion direction of the diffused light at an arbitrary-selected first emergent point on said diffusing surface, $\phi_2$ is an angle of a principal diffusion direction of the diffused light at an arbitrary-selected second emergent point, which is different from the first emergent point, on said diffusing surface, $r_1$ is a distance from the first emergent point on said diffusing surface to the optical axis, and $r_2$ is a distance from the second emergent point on said diffusing surface to the optical axis.

7. An illumination optical system according to any one of claims 1, 2 or 3, wherein a pattern of diffusion of said diffusing surface is formed using a holographic technique.

8. An illumination optical system according to claim 4, wherein a pattern of diffusion of said diffusing surface is formed using a holographic technique.

9. An illumination optical system according to claim 5, wherein a pattern of diffusion of said diffusing surface is formed using a holographic technique.

10. An illumination optical system according to claim 6, wherein a pattern of diffusion of said diffusing surface is formed by a holographic technique.

* * * * *